United States Patent
DiTomaso et al.

(10) Patent No.: US 10,977,321 B2
(45) Date of Patent: Apr. 13, 2021

(54) SYSTEM AND METHOD FOR WEB CONTENT MATCHING

(71) Applicants: Joseph DiTomaso, New York, NY (US); William Beckler, New York, NY (US)

(72) Inventors: Joseph DiTomaso, New York, NY (US); William Beckler, New York, NY (US)

(73) Assignee: ALLTHEROOMS, New York, NY (US)

( * ) Notice: Subject to any disclaimer, the term of this patent is extended or adjusted under 35 U.S.C. 154(b) by 684 days.

(21) Appl. No.: 15/271,757

(22) Filed: Sep. 21, 2016

(65) Prior Publication Data

US 2018/0081975 A1   Mar. 22, 2018

(51) Int. Cl.
| | |
|---|---|
| *G06F 16/901* | (2019.01) |
| *G06F 16/9038* | (2019.01) |
| *G06Q 50/16* | (2012.01) |
| *G06F 16/9535* | (2019.01) |
| *G06Q 30/06* | (2012.01) |

(52) U.S. Cl.
CPC ........ *G06F 16/9535* (2019.01); *G06F 16/901* (2019.01); *G06F 16/9038* (2019.01); *G06Q 30/0645* (2013.01); *G06Q 50/16* (2013.01)

(58) Field of Classification Search
CPC .............. G06F 16/901; G06F 16/9038; G06F 16/9535; G06Q 30/0645; G06Q 50/16
USPC ................................................. 707/600–899
See application file for complete search history.

(56) References Cited

U.S. PATENT DOCUMENTS

| | | | |
|---|---|---|---|
| 2002/0051540 A1* | 5/2002 | Glick | G06F 21/10 380/258 |
| 2007/0198600 A1* | 8/2007 | Betz | G06F 16/2365 |
| 2007/0276845 A1* | 11/2007 | Geilich | G06F 16/29 |
| 2011/0282868 A1* | 11/2011 | Ishii | G06F 16/93 707/722 |
| 2012/0246154 A1* | 9/2012 | Duan | G06F 16/2455 707/728 |
| 2013/0185306 A1* | 7/2013 | Botros | G06F 16/2457 707/748 |
| 2014/0059015 A1* | 2/2014 | Zinar | G06F 16/215 707/692 |
| 2014/0280757 A1* | 9/2014 | Tran | G06Q 50/10 709/219 |

* cited by examiner

*Primary Examiner* — Irete F Ehichioya
*Assistant Examiner* — Xiaoqin Hu
(74) *Attorney, Agent, or Firm* — Buckley, Maschoff & Talwalkar LLC

(57) ABSTRACT

Provided are a system and method for performing deduplication of web content. In one example, the method includes converting search results of a first website into a first fuzzy index and converting search results of a second website into a second fuzzy index, determining a search result of the first website corresponds to a same item as a search result of the second website based on a comparison of the first fuzzy index and the second fuzzy index, and displaying a comparison of web content associated with the item from the first search result and web content associated with item from the second search result. The deduplication of content according to various embodiments may be performed on the fly without storing web content in a centralized database.

20 Claims, 5 Drawing Sheets

FIG. 3

| Name | Geo Location |
|---|---|
| Hotel Y, Connecticut | Lat1, Long1 |
| Hotel Y, Connecticut | Lat2, Long2 |
| Hotel Y, Connecticut | Lat3, Long3 |
| Hotel Y, Connecticut | Lat4, Long4 |
| Hotel Y, Connecticut | Lat5, Long5 |
| Hotel Y, Connecticut | Lat6, Long6 |
| Hotel Y, Connecticut | Lat7, Long7 |
| Hotel Y, Connecticut | Lat8, Long8 |
| Hotel Y, Connecticut | Lat9, Long9 |

310 / 311

| Name | Geo Location |
|---|---|
| Hotel Y, Connecticut | Lat1, Long1 |
| Hotel Y, Connecticut | Lat2, Long2 |
| Hotel Y, Connecticut | Lat3, Long3 |
| Hotel Y, Connecticut | Lat4, Long4 |
| Hotel Y, Connecticut | Lat5, Long5 |
| Hotel Y, Connecticut | Lat6, Long6 |
| Hotel Y, Connecticut | Lat7, Long7 |
| Hotel Y, Connecticut | Lat8, Long8 |
| Hotel Y, Connecticut | Lat9, Long9 |

320 / 326

SYSTEM AND METHOD FOR WEB CONTENT MATCHING

BACKGROUND

Various search engines (e.g., comparison websites) compare web content from multiple websites and provide a user with a comparison of various attributes of the web content from the multiple sites, for example, price, availability, and other features. One industry where such comparisons often take place is in the retail industry where web visitors can filter and compare attributes of items. Comparison websites typically collect web content from multiple websites and databases and store the collected web content in a large centralized database. For example, a retail website may provide a list of products that are listed on the website to the centralized database such that the products can be compared with the same products listed on other retail websites. Another approach for collecting the web content is for the central database to perform a crawl for the web content. In this example, the central database or an agent thereof may scan retail web pages to retrieve product information such as features and prices and store the scanned information in the centralized database instead of relying on the retailer to provide such information. Additional approaches include receiving a data feed or a consolidated data feed of the web content from multiple websites including the product information, crowdsourcing data, and the like, and storing the web content in the centralized database.

However, one of the drawbacks of accumulating web content from multiple websites is that web content is always being updated, added, removed, and the like, at those websites. In order to keep track of the changes to the web content, the central database uses pointers to the web content at each site. For example, for a single hotel comparison, a travel related website may have a pointer to twenty different websites in order to gather web content from those twenty sites for comparing twenty possible prices for the hotel location. These pointers are typically generated manually by a user of the central database requiring significant time and delay. In addition, in the example of travel related websites, hotels are regularly being opened and closed throughout the world. For example, approximately fifty new hotels may open on one day while fifty hotels may close that same day. In order for the travel related website to maintain and keep track of the new hotels and the closing hotels, a user of the database must manually add the new hotels while at the same time removing the fifty hotels that are no longer valid.

Due to the changing, adding, deleting, and the like, of web content on a website, a centralized database typically performs a massive crawl/update on a daily basis such that the comparison website has the most recent changes. However, keeping track of this data is a significant and time-consuming event. Accordingly, what is needed is an automated system that does not use a centralized database and that does not require manual updates thereby avoiding the hassle of maintaining and updating a large amount of data on a continual basis.

SUMMARY

According to an aspect of an example embodiment, provided is a content comparison method for performing deduplication of web content, the content comparison method including converting search results of a first website into a first fuzzy index and converting search results of a second website into a second fuzzy index, determining at least one search result of the second website is a duplicate of at least one search result of the first website, respectively, based on a comparison of the second fuzzy index to the first fuzzy index, and displaying a combined list of search results including the search results from the first website and the search results from the second website with the at least one determined duplicate search result from the second website being excluded from the list.

According to an aspect of another example embodiment, provided is a computing device for performing deduplication of web content, the computing device including a processor configured to convert search results of a first website into a first fuzzy index and convert search results of a second website into a second fuzzy index, and to determine at least one search result of the second website is a duplicate of at least one search result of the first website, respectively, based on a comparison of the second fuzzy index to the first fuzzy index, and a network interface configured to output, to a user device, a combined list of search results including the search results from the first website and the search results from the second website with the at least one determined duplicate search result from the second website being excluded from the list.

According to an aspect of another example embodiment, provided is a non-transitory computer readable medium having stored therein instructions that when executed cause a computer to perform a method for performing deduplication of web content, the content comparison method including converting search results of a first website into a first fuzzy index and converting search results of a second website into a second fuzzy index, determining at least one search result of the second website is a duplicate of at least one search result of the first website, respectively, based on a comparison of the second fuzzy index to the first fuzzy index, and displaying a combined list of search results including the search results from the first website and the search results from the second website with the at least one determined duplicate search result from the second website being excluded from the list.

Other features and aspects may be apparent from the following detailed description, the drawings, and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a process of comparing two fuzzy indexes for performing matching of web content in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

Figure 1:
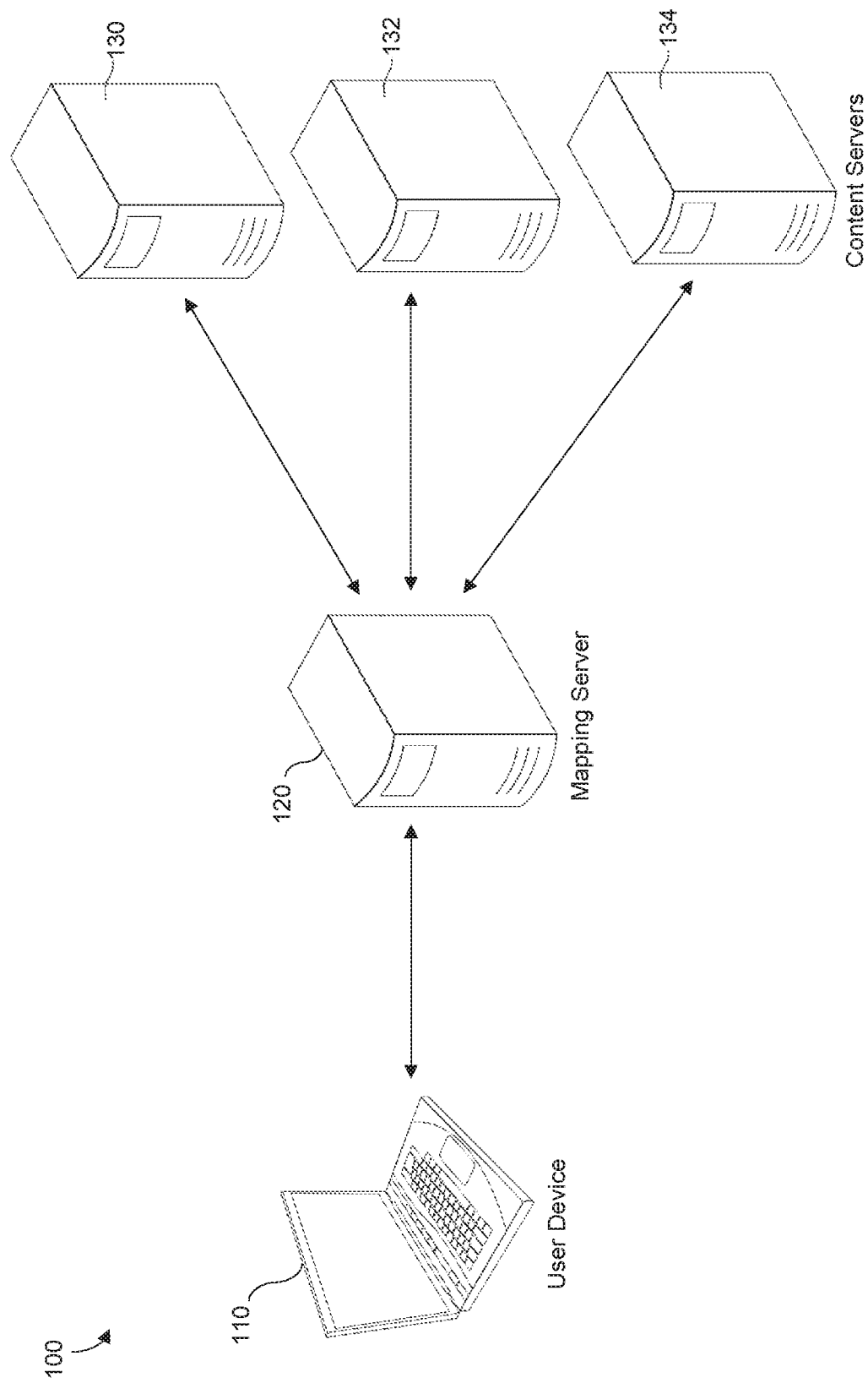
FIG. 1 is a diagram illustrating a system for performing matching of web content in accordance with an example embodiment.

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

According to various embodiments, provided herein is a system and method for matching web content corresponding to the same unique item from across multiple websites without storing the web content in a centralized database. For example, the item may refer to a rental property, a hotel, a product, a service, and the like. When a comparison website or a search engine provides an aggregate of search results or provides a comparison of web content (e.g., price, criteria, availability, etc.) for a same product (and brand) from across multiple sources, it may be desirable to reduce or eliminate search results for the same listing from the aggregate or only provide a subset of the search results such that the combined search results are more efficient for the user to navigate through. As a non-limiting example, a comparison travel website may receive search results corresponding to the same hotel from multiple website and consolidate the search results into a single search result for that hotel that compares different content such as price, features, availability, and the like. The removal of redundant search results may be referred to as data deduplication which is a data compression technique for eliminating duplicate copies of repeating data. As another example, the comparison site may only extract some content from a plurality of search results corresponding to the same item from across multiple websites (e.g., price for an item on multiple sites, availability of item from multiple sites, etc.) while eliminating the rest of the content. The example embodiments simplify the manner in which search results are matched with one another by reducing the amount of data that is required to compare search results, thereby reducing processing power and time needed to compare search results from multiple websites across the Internet.

Related comparison sites often use a centralized database to store web content from multiple sources and typically require manual input that is performed on a regular basis. However, the web content is dynamic in that web content is constantly being updated, changed, added, deleted, and the like. In an example of a retail website, the price of an item is often changing (e.g., sales, discounts, specials, etc.), new products are being added, and old products are being removed. Therefore, in order to compare web content from across multiple retail websites accurately, the content from these sites must be updated in the centralized database on a regular basis such as hourly, daily, weekly, and the like. Furthermore, related comparison sites are only capable of detecting that a search result of a second website is a duplicate of a search result of a first website if the web content included therein is a perfect match with the web content of the first website. In other words, if there is a difference between any of the name of an item, address, description, etc., of two search results (even though the search results refer to the same item, product, hotel, etc.), the matching process is not able to match the web content and remove redundant search results without manual interaction.

According to various aspects, the matching between two pieces of web content may be performed in real time or "on the fly" by simplifying variables associated with the web content and auto-mapping the web content based on the simplified variables. For example, a user may input a search query into a search engine in order to search for web content associated with real property such as a home, a hotel, a motel, a restaurant, an office, a building, an apartment, and the like. When the search engine performs a search for available property listings matching the user's search query, the search may be performed across multiple sites. As a result, multiple search results corresponding to the same property may be collected. Therefore, it may be desirable to reduce the multiple search results into a single search result or reduce the content of the multiple search results into a consolidated search result providing information from multiple sites.

When the search results are for a rental property or other similar product, a geo-location and/or a name of the property may be simplified (or reduced) thereby simplifying the amount of data that is needed to perform matching between search results. Furthermore, rather than storing web content in a central database and subsequently performing a matching operation between the web content, the web content may be auto-matched in real time because the data of the search result used for comparison matching is simplified making it easier (i.e., less data resulting in faster processing speed) to process the matching operation. That is, web content from multiple websites across the Internet may be extracted, simplified, and compared with each other live in response to the search query input by the user through the search engine, comparison website, and the like. Accordingly, the example embodiments may perform a content comparison from multiple websites and provide an aggregate list of content as search results from the multiple websites with search results to the same item being removed and without storing any of the content in a centralized database. Furthermore, because the web content is extracted live at the time of the search query being input, the most up-to-date web content is guaranteed.

FIG. 1 illustrates a system 100 for performing matching of web content in accordance with an example embodiment. Referring to FIG. 1, the system includes a user device 110 connected to a mapping server 120 via a network such as the Internet. The user device 110 may be a computer, a mobile device, a smart wearable device, a tablet, an appliance, a kiosk, and the like. In the example of FIG. 1, the mapping server 120 may host a website such as a search engine, a comparison site, a content providing site, and the like, and the user device 110 may connect to the mapping server 120 by entering a web address of the website through a web browser installed on the user device 110. In addition, the mapping server 120 may be connected to a plurality of content servers 130, 132, and 134, and collect web content from across the content servers 130, 132, and 134 (e.g., from websites hosted by the content servers 130, 132, and 134). For example, the mapping server 120 may collect retail content, travel related content, news related content, entertainment content, and the like, from across the multiple content server 130, 132, and 134. For convenience of explanation, some examples herein refer to travel related web content such as hotel rentals, vacation home rentals, flights, and the like, however, it should be appreciated that other types of web content may be used such as retail web content, news content, medical content, entertainment content, and the like, without any difference in the function of the system and methods.

Rather than collect detailed web content from the content server 130, 132, and 134, in advance, and store the web content in a centralized database, the mapping server 120 may collect simplified web content in response to a search query being input from the user device 110. For example, the user of the user device 110 may enter a search term, characters, plurality of words, etc., into a search bar on a website provided by mapping server 120. In response to the search query being input, the mapping server 120 may scan websites provided by content servers 130, 132, and 134, and identify web content related to the search query as search results. In addition, rather than store the related web content in a centralized database, the related web content may be converted into a simplified representation of the web contents such as a fuzzy index of the content. According to various embodiments, the fuzzy index may include one or more columns of data, and a plurality of rows (one for each search result).

As an example, the mapping server 120 may generate a first fuzzy index for related search results collected from a first website hosted by the content server 130. To generate the first fuzzy index, the mapping server 120 may extract simplified data of the web content of each search result from the first website and build the first fuzzy index. In this case, the extracted data may be simplified (e.g., converted) before it is inserted into the fuzzy index. For example, the search query may be a request for search results for hotel accommodations in a specific geolocation (e.g., town, city, zip code, state, etc.). Here, a plurality of search results may represent a plurality of hotels and/or vacation home rentals. The hotels may have both a name and a geolocation included within the web content on the website, as well as other information such as rating, description, features, amenities, travel directions, etc. To generate a first column of the first fuzzy index, the name of the hotel as listed on the website may be converted into a fuzzy name by extracting only keywords from the name and removing other words. In addition, to generate a second column of the first fuzzy index the hotel geolocation may be converted into a fuzzy location by expanding the geolocation based on zip code, zip code+4, town, city, and/or the like, and the fuzzy name and/or the fuzzy geolocation may be inserted into the first fuzzy index for each search result (i.e., each hotel or vacation rental). Therefore, the first fuzzy index may include a table of search results represented by only two variables, a fuzzy name and a fuzzy geolocation.

The mapping server 120 may perform the same process and generate a second fuzzy index for a second website hosted by the content server 132 and generate a third fuzzy index for a third website hosted by the content server 134. According to various embodiments, the mapping server 120 may identify or otherwise match duplicate search results between at least two of the websites by comparing their respective fuzzy indexes to each other. For example, the mapping server 120 may match duplicate search results from the first website and the second website by comparing the first and second fuzzy indexes, rather than comparing the entire web content of each search result from each of the first and second websites.

Accordingly, the mapping server 120 may map a search result of the first website to a duplicate search result on the second website based on the matching. Furthermore, the mapping server 120 may generate a master list or an aggregated list of search results that are combined from the first and second websites and perform deduplication of the search results by removing additional search results for the same item based on the comparison of the first and second fuzzy indexes. In this case, if a search result from the first website is to the same item as a search result of the second website based on matching respective entries in the first and second fuzzy indexes, the search result from the second website can be determined as being a redundant search result of the first website, and be removed from the aggregated list of search results. Furthermore, the aggregated list of search results with redundant search results removed may be output from the mapping server 120 to a display of the user device 110.

Figure 2:
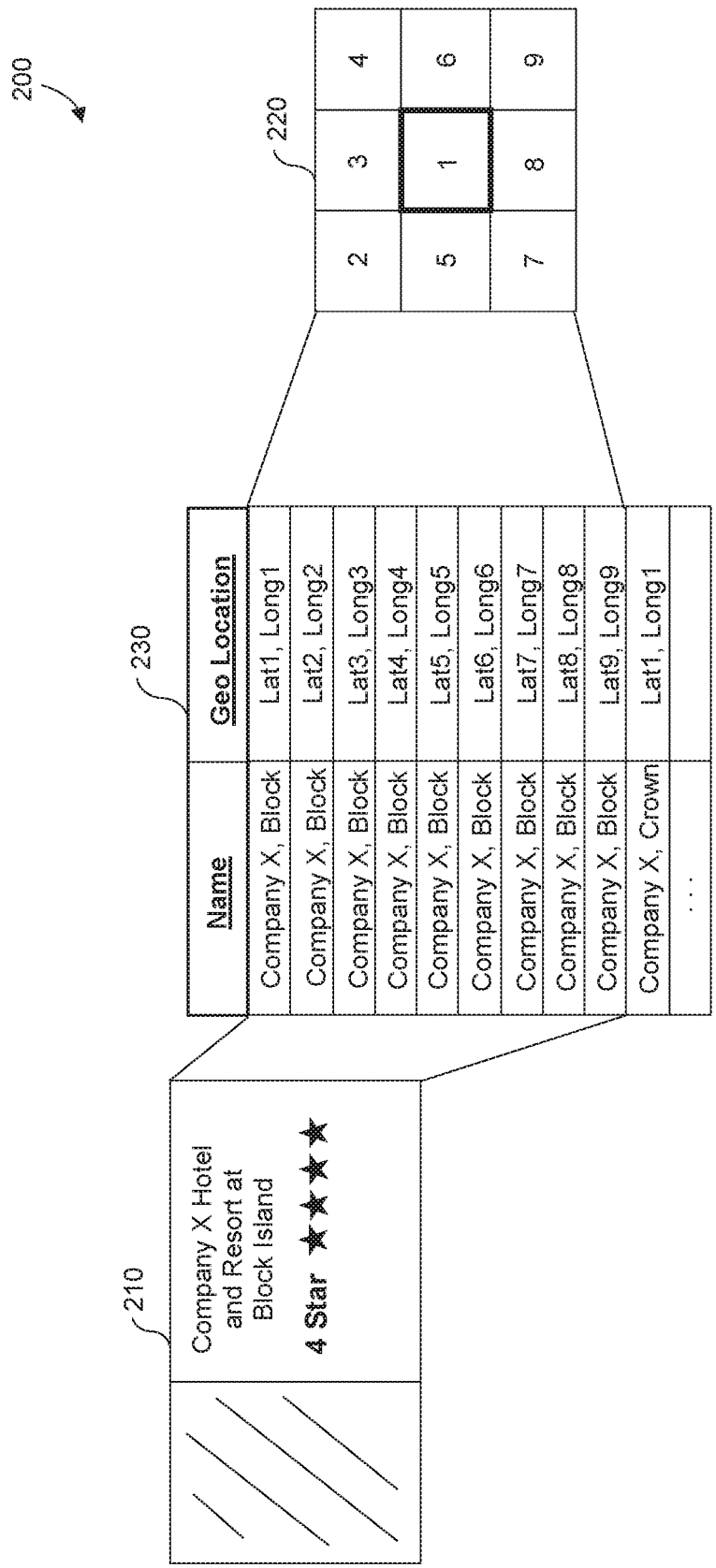
FIG. 2 is a diagram illustrating a process of generating a fuzzy index for performing matching of web content in accordance with an example embodiment.

FIG. 2 illustrates a process 200 of generating a fuzzy index for performing matching of web content in accordance with an example embodiment. For example, the process 200 may be performed by the mapping server 120 shown in FIG. 1. Referring to FIG. 2, a hotel resort search result 210 is used to generate a fuzzy index 230. The fuzzy index 230 may be used to compare the search results from a first website with search results of another website. Many websites perform comparison of items, products, travel accommodations, and the like. For example, a user can search websites for finding the cheapest price on books, cars, hotels, consumer electronics, services, and the like. Typically, these websites work with a central database which stores a list of unique product codes for each available products.

In the field of hotels and other types of travel rentals, every single hotel and hotel chain typically has its own product code in the central database. Furthermore, the central database typically includes multiple pointers to multiple web sites to aggregate web content of the hotel from multiple sources and aggregate the web content, for example, prices, specials, discounts, availability, etc., of the hotel and provide the content into a unified page, format, layout, and the like. As an example, the Waldorf Astoria may be listed as hotel #1234 on hotels.com and be listed as hotel #5678 on hotwire.com. Using these product codes as pointers, the central database may combine the data from multiple sites into a single comparison site giving the reader multiple prices for a single item.

Typically, however, hotels on two different sites are compared to each other manually to determine if they are in fact a listing of the same hotel. That is, when you have the same hotel listed on different websites, there is a manual mapping of the hotels to one listed hotel on the comparison search site. The reasons for this is that hotels are often not matched perfectly between different websites. For example, however slight, the name of a hotel may be listed differently on different websites such that a perfect match between hotel names is not possible. As another example, an address of the hotel or a geo-location of the hotel may not be an exact match between two websites. Therefore, automatic comparison of hotel listings based on the listed web content may be fraught with mistakes.

In addition, there are over one million hotels available globally. Everyday there are hundreds of hotels opening and hundreds of hotels closing all around the world. In addition, websites are always adding and removing hotels from the pool of returnable search results. Therefore, a central database with over a million hotels plus multiple pointers to multiple sites (prices) for each hotel requires a massive amount of data to be updated on a daily/weekly basis. In addition, the central database requires an operator to manually update pointers to various websites to provide an aggregate of listings from multiple sites for the same hotel. The exemplary embodiments provide a system that avoids the need for a central database as well as the need for manual updates to the central database.

According to various embodiments, as shown in FIG. 2, rather than pre-store web content in a central database, the web content may be simplified and matched to each other in real time. As shown in FIG. 2, hotel search result 210 for a hotel named "Company X Hotel and Resort at Block Island" is converted into a simplified name in which keywords are extracted from the original name, and the rest of the words are removed. After the name is converted into a simplified name, the simplified name is added to the fuzzy index 230. In this example, the keywords "Company X" and "Block" are extracted from the original name of the hotel from search result 210. Furthermore, the simplified name of all hotels added to the fuzzy index 230 may be automatically alphabetized making the index easier to search. Accordingly, that amount of data needed to make a comparison is reduced from the original web content included in search result 210 to the simplified names or fuzzy names included in the fuzzy index 230.

In addition to generating a fuzzy name of the hotel, a fuzzy geographic location of the hotel may be generated as well. For example, a geolocation of the hotel may be determined based on geocodes extracted from location information included in the search result. Geocoding is a computational process of transforming a description of a location (textual information on addresses or places) to a location on the Earth's surface (spatial representation in numerical coordinates). For example, coordinates such as a latitude number and longitude number may be determined based on the geocodes. In the example of FIG. 2, an exact geographic location of the hotel determined based on geocodes is shown as block 1. In order to generate a fuzzy geolocation, for example, the example embodiments may also add immediately surrounding geographic blocks such as blocks 2-9 shown in 220. Therefore, instead of one entry for the hotel being included in the fuzzy index 230, the fuzzy index 230 includes nine entries for the hotel representing the simplified name of the hotel in one column and the nine different geolocation blocks in the other column. That is, the example embodiments also look in adjacent geo locations rather than perform distance calculations, or the like, performed by the related art which can be rather complicated. Therefore, the predictable area does not require an exact geo-match but can include wiggle room for error.

Accordingly, even if the geographic location and/or the name of the hotel is not perfect between two hotel listings on two websites, a fuzzy match can still be made, and the two hotels listing search results may be determined to be the same hotel. As a result, a deduplication operation may be performed to remove the duplicate search result thereby making the search results more compact and efficient.

FIG. 3 illustrates a process of comparing two fuzzy indexes for performing matching of web content in accordance with an example embodiment. In this example, first fuzzy index 310 corresponds to search results from a first website and second fuzzy index 320 corresponds to search results from a second website. The first and second fuzzy indexes 310 and 320 may be generated in the same manner as the fuzzy index 230 shown in the example of FIG. 2. Referring to FIG. 3, fuzzy matching of two hotels (or search results) using two data points extracted from the search results (expanded geolocation and unique keywords in the hotel name) is performed. In this example, the hotel search result of the first website used to generate the first fuzzy index 310 may list the name of the hotel as "The Hotel Y in Central Connecticut." Meanwhile, the hotel search result of the second website used to generate the second fuzzy index 320 may list the name of the same hotel as "The Hotel Y in the Borough of Woodmont, Milford, CT." Rather than compare the entire name, the fuzzy indexes 310 and 320 may extract the keywords Hotel Y Connecticut from the respective listings, and remove the other words. As a result, both the first fuzzy index 310 and the second fuzzy index 320 have the same simplified name as Hotel Y, Connecticut.

In addition, the exact geolocation determined from geocodes of the search result in the first website may result in a different geolocation determined from the geocodes of the search result in the second website. However, because the geolocations are expanded, there may still be a match. In this example, entry 311 of the first fuzzy index 310 has a name, and a geolocation that matches the name and geolocation of entry 326 in the second fuzzy index 320. Accordingly, a match can be made of two search results using two fuzzy indexes. Furthermore, when generating an aggregated search result, a deduplication operation may be performed to remove the duplicate search result from the second website thereby making the search results more compact and efficient. That is, there is no massive central database needed to store the data and no team of people needed to manually enter data into a database. The search may be performed live, automatically and on the spot.

According to various embodiments, search speed may be required here because the results may be provided in real-time. An average hotel search may find 4,000 hotels from 20 different sites, requiring 80,000 hotel matches. Therefore, a lot of computation would slow the process down. To address this, the disclosure may take the web content and create a fuzzed index with two data points (geo location+simplified hotel name) and perform a comparison using the fuzzed indexes. That is, the example embodiments may massages the data rapidly by simplifying the data thereby requiring only a small amount of computation. As a result, the search speed can actually be faster than database driven comparisons. Furthermore, an index is a way of looking up something quickly. At the back of a book, an index is used to provide a simple location where a word is found and every word in the index is sorted alphabetically making it easy and clean to use. However, matching products/hotels from two separate search result lists is not easy because it's not likely going to be a perfect match. The exemplary embodiments generate a clean way of auto-matching search results from two websites by fuzzing two variables (location+alphabetized keywords from the name) to create entries in respective fuzzy indexes.

Figure 4:
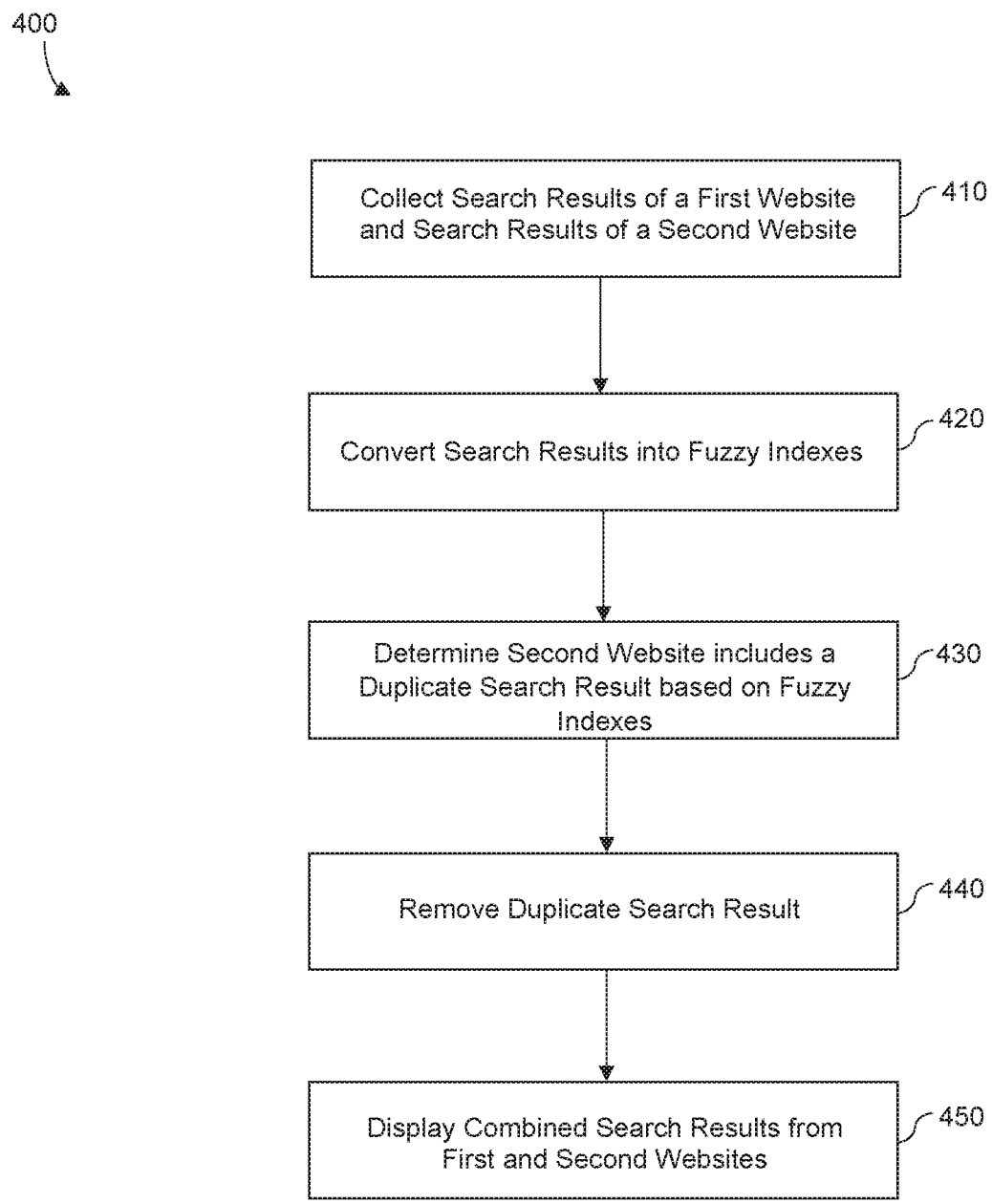
FIG. 4 is a diagram illustrating a method for performing matching of web content in accordance with an example embodiment.

FIG. 4 illustrates a method 400 for performing matching of web content in accordance with an example embodiment. For example, the method 400 may be performed by the content mapping server 120 shown in FIG. 1, or another device or combination of devices. Referring to FIG. 4, the method includes collecting search results from a first website and a second website based on a user query being input, in 410. For example, the user query may be input into a search bar of a comparison website (e.g., a third website) separate from the first and second websites. As another example, the user query may be input into a search bar of one of the first or second websites. According to various embodiments, rather than pre-store search results and/or other web content in advance, the search results may be collected in real-time, live, and the like. In 420, the method further includes converting the search results of the first website into a first fuzzy index and converting the search results of the second website into a second fuzzy index. For example, the search results may be simplified by taking the web content associated with the search results, and extracting only a small amount of features therefrom such as one or more keywords of a product name, hotel name, or the like.

The method further includes comparing the first and second fuzzy indexes and determining at least one search result of the second website that corresponds to the same item as at least one search result of the first website, respectively, based on the comparison of the second fuzzy index to the first fuzzy index, in 430. For example, the determining may include determining a search result of the second website is associated with the same item, hotel listing, service, product, and the like, as a search result of the first website in response to an entry of the second fuzzed index corresponding to the search result of the second website being an exact match of an entry of the first fuzzy index corresponding to the search result of the first website. In 440, the method includes removing the redundant search result from the second website from a master list or an aggregated list of search results that are combined from the first and second websites such that the redundant search result included in both the first website and the second website is only listed once in the aggregated list of combined search results. The method further includes displaying a combined list of search results including the search results from the first website and the search results from the second website with the at least one determined duplicate search result from the second website being excluded from the list, in 450. As another example, rather than remove the matched or redundant search results and display a list, the example embodiments may generate a comparison of web content from search results corresponding to the same item, for example, a price comparison, an attribute comparison, and the like.

According to various embodiments, a first search result and a second search result may correspond to the same product, item, hotel listing, or the like, however, the first and second search results may not be an exact match with each other for one or more reasons. For example, one or more of a product name, product description, production location, and the like, may be different between two search results on two different websites. However, rather than compare the entire content of each of the first and second search results with one another, the web content may simplified and then compared to determine whether there is a match. For example, one or more keywords of a name of the product, item, hotel, etc., may be extracted and used for a comparison. As another example, other features of the search results may be fuzzed providing more wiggle room. For example, a geolocation of a hotel may be expanded or broadened to accommodate for discrepancies in geolocation as a result of human error, or the like. Accordingly, by fuzzing variables of each search result, the fuzzed variables may simplify the first and second search results such that they are exact matches while still retaining enough unique information about the original web content of the search result such that the product, item, hotel listing, and the like, is still uniquely identifiable.

As one non-limiting example, the search results from the first website may include a first list of rental properties and the search results from the second website may include a second list of rental properties. In this case, the first fuzzy index and the second fuzzy index may each include a column having a value representing a fuzzy name of a rental property associated with a search result and a column having a value representing a fuzzy geolocation of the rental property associated with the search result. Here, the fuzzy name of the rental property associated with the search result may include the name of the rental property as listed on the respective website with one or more words removed therefrom. The fuzzy geolocation of the rental property associated with the search result may include a geolocation determined based on a geocode of the rental property, and a plurality of immediately surrounding geolocations of the geolocation of the rental property in addition to the exact geolocation. As a result, the geolocation may have some wiggle room when performing matching.

Figure 5:
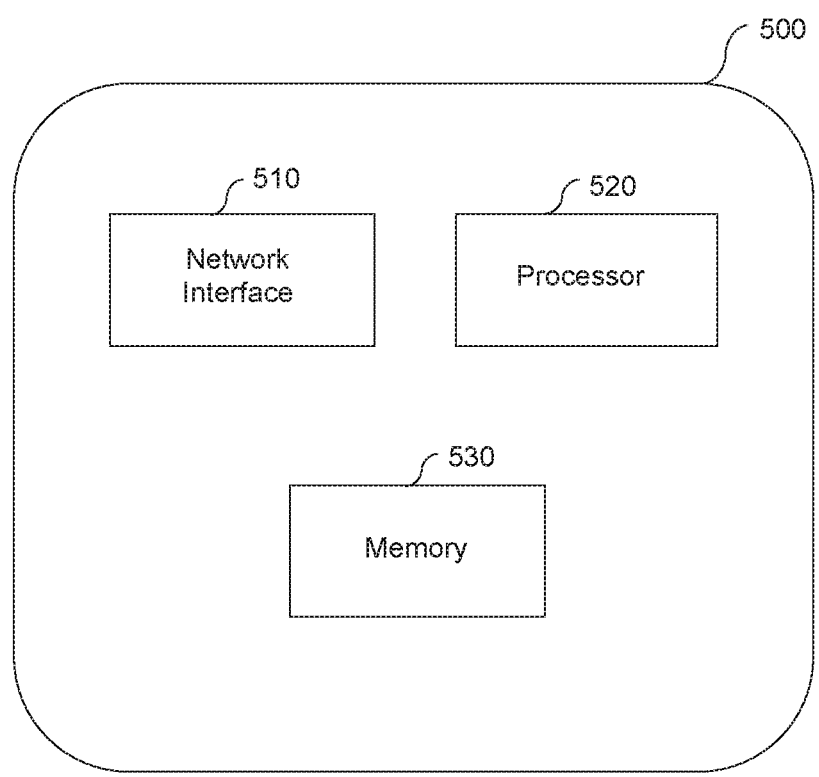
FIG. 5 is a diagram illustrating a device for performing matching of web content in accordance with an example embodiment.

FIG. 5 illustrates a device 500 for performing deduplication of web content in accordance with an example embodiment. For example, the device 500 may correspond to the content mapping server 120 of FIG. 1, and may perform the method of FIG. 4. Referring to FIG. 5, the device 500 includes a network interface 510, a processor 520, and a memory 530. Although not shown in FIG. 5, the device 500 may include other features, for example, an input unit, a transmitter, a receiver, a display, and the like. The network interface 510 may transmit and receive data over a network such as the Internet. The processor 520 may include a single core processing device, a multicore processing device, or multiple processing devices. The processor may control the overall operations of the device 500. The memory 530 may include any desired memory, for example, random access memory (RAM), one or more hard disks, cache, hybrid memory, an external memory, flash memory, and the like.

In this example, the network interface 510 may receive or otherwise collect search results from a first website and search results from a second website. As an example, the search results may be collected or received from the first and second websites in response to a user query input on a third website, or input on one of the first or second websites. The processor 520 may convert search results of a first website into a first fuzzy index and convert search results of a second website into a second fuzzy index. For example, the processor 520 may simplify content included in the search results by fuzzing the data making the data broader in scope. The processor 520 may determine at least one search result of the second website that is a duplicate of at least one search result of the first website, respectively, based on a comparison of the second fuzzy index to the first fuzzy index. Furthermore, the network interface 510 may output, to a user device, a combined list of search results including the search results from the first website and the search results from the second website with the at least one determined duplicate search result from the second website being excluded from the list.

For example, the processor 520 may determine that a search result of the second website is a duplicate of a search result of the first website in response to an entry of the second fuzzed index corresponding to the search result of the second website being a match of an entry of the first fuzzy index corresponding to the search result of the first website. According to various embodiments, the search results of the first website and the search results of the second website are not pre-stored in a central database, but may be collected by the processor 520 and/or the network interface 510 from the first and second websites via the Internet in response to a user query being input on a third website.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A content comparison method comprising:
    converting search results of a first website into a first fuzzy index structure comprising entries which include pairs of fuzzy name values and fuzzy geolocation values corresponding to the search results of the first website;
    converting search results of a second website into a second fuzzy index structure comprising entries which include pairs of fuzzy name values and fuzzy geolocation values for the search results of the second website;
    comparing the entries in the first fuzzy index structure to the entries in the second fuzzy index structure;
    determining, via the comparing, a search result of the first website that corresponds to a same item as a search result of the second website, the determining comprising identifying an entry in the first fuzzy index structure that comprises a same fuzzy name value and fuzzy geolocation pair as an entry in the second fuzzy index structure; and
    displaying an aggregated list of search results combined from the first website and the second website with the corresponding search result from the second website being excluded from the list.

2. The content comparison method of claim 1, wherein the method further comprises collecting the search results from the first website and the search results from the second website in response to a search query being input on a third website.

3. The content comparison method of claim 1, wherein the determining comprises determining the search result of the first website is a duplicate of the search result of the second website in response to a fuzzy name value and fuzzy geolocation value pair in an entry of the first fuzzy index structure being an exact match as a corresponding fuzzy name value and fuzzy geolocation value pair in an entry of the second fuzzy index structure.

4. The content comparison method of claim 1, wherein the search results of the first website and the search results of the second website are not pre-stored in a central database, and are collected from the first and second websites via the Internet in response to a user query being input on a third website.

5. The content comparison method of claim 1, wherein the search results from the first website comprise a first list of live rental property listings and the search results from the second website comprise a second list of live rental property listings.

6. The content comparison method of claim 5, wherein the first and second fuzzy index structures each comprise a column representing a fuzzy name value of a respective rental property and a column representing a fuzzy geolocation value of the respective rental property.

7. The content comparison method of claim 6, wherein the fuzzy name value of the rental property comprises one or more keywords of a name of the rental property as listed on the respective website with at least one word from the name being removed.

8. The content comparison method of claim 6, wherein the fuzzy geolocation value of the rental property comprises a geolocation determined based on a geocode of the rental property, and a plurality of immediately surrounding geolocations with respect to the geolocation of the rental property.

9. A computing device for performing deduplication of web content, the computing device comprising:
    a processor configured to
        convert search results of a first website into a first fuzzy index structure comprising entries which include pairs of fuzzy name values and fuzzy geolocation values corresponding to the search results of the first website,
        convert search results of a second website into a second fuzzy index structure comprising entries which include pairs of fuzzy name values and fuzzy geolocation values for the search results of the second website,
        compare the entries in the first fuzzy index structure to the entries in the second fuzzy index structure, and
        determine, via the comparison, a search result of the first website that corresponds to a same item as a search result of the second website, wherein the determination comprises identifying an entry in the first fuzzy index structure that comprises a same fuzzy name value and fuzzy geolocation pair as an entry in the second fuzzy index structure;

a generator configured to generate an aggregated list of search results combined from the first website and the second website with the corresponding search result from the second website being excluded from the list; and a network interface configured to output, to a user device, the aggregated list with the search result of the second website excluded.

10. The computing device of claim 9, wherein the network interface is further configured to receive the search results from the first website and the search results from the second website, in response to a search query being input on a third website.

11. The computing device of claim 9, wherein the processor is configured to determine the search result of the first website is a duplicate of the search result of the second website in response to a fuzzy name value and a fuzzy geolocation value pair in an entry of the first fuzzy index structure being an exact match as a corresponding fuzzy name value and fuzzy geolocation value pair in an entry of the second fuzzy index structure.

12. The computing device of claim 9, wherein the search results of the first website and the search results of the second website are not pre-stored in a central database, and are collected from the first and second websites via the Internet in response to a user query being input on a third website.

13. The computing device of claim 9, wherein the search results from the first website comprise a first list of live rental property listings and the search results from the second website comprise a second list of live rental property listings.

14. The computing device of claim 13, wherein the first and second fuzzy index structures each comprise a column representing a fuzzy name value of a respective rental property and a column representing a fuzzy geolocation value of the respective rental property.

15. The computing device of claim 14, wherein the fuzzy name value of the rental property comprises one or more keywords of a name of the rental property as listed on the respective website with at least one word from the name being removed.

16. The computing device of claim 14, wherein the fuzzy geolocation value of the rental property comprises a geolocation determined based on a geocode of the rental property, and a plurality of immediately surrounding geolocations with respect to the geolocation of the rental property.

17. A non-transitory computer readable medium having stored therein instructions that when executed cause a computer to perform a method for performing deduplication of web content, the method comprising:

converting search results of a first website into a first fuzzy index structure comprising entries which include pairs of fuzzy name values and fuzzy geolocation values corresponding to the search results of the first website;

converting search results of a second website into a second fuzzy index structure comprising entries which include pairs of fuzzy name values and fuzzy geolocation values for the search results of the second website;

comparing the entries in the first fuzzy index structure to the entries in the second fuzzy index structure;

determining, via the comparing, a search result of the first website that corresponds to a same item as a search result of the second website, the determining comprising identifying an entry in the first fuzzy index structure that comprises a same fuzzy name value and fuzzy geolocation pair as an entry in the second fuzzy index structure; and displaying an aggregated list of search results combined from the first website and the second website with the corresponding search result from the second website being excluded from the list.

18. The non-transitory computer readable medium of claim 17, wherein the determining comprises determining the search result of the first website is a duplicate of the search result of the second website in response to a fuzzy name value and fuzzy geolocation value pair in an entry of the first fuzzy index structure being an exact match as a corresponding fuzzy name value and fuzzy geolocation value pair in an entry of the second fuzzy index structure.

19. The non-transitory computer readable medium of claim 17, wherein the search results of the first website and the search results of the second website are not pre-stored in a central database, and are collected from the first and second websites via the Internet in response to a user query being input on a third website.

20. The non-transitory computer readable medium of claim 17, wherein the search results from the first website comprise a first list of live rental property listings and the search results from the second website comprise a second list of live rental property listings.

* * * * *